US011036343B2

(12) United States Patent
Kim et al.

(10) Patent No.: US 11,036,343 B2
(45) Date of Patent: Jun. 15, 2021

(54) INPUT-SENSING CIRCUIT AND DISPLAY MODULE INCLUDING THE SAME

(71) Applicant: Samsung Display Co., Ltd., Yongin-si (KR)

(72) Inventors: Jong-Hwa Kim, Yongin-si (KR); Kyungsu Lee, Suwon-si (KR); Jeongyun Han, Hwaseong-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 16/859,878

(22) Filed: Apr. 27, 2020

(65) Prior Publication Data

US 2020/0341592 A1 Oct. 29, 2020

(30) Foreign Application Priority Data

Apr. 29, 2019 (KR) ........................ 10-2019-0049944

(51) Int. Cl.
*G06F 3/044* (2006.01)

(52) U.S. Cl.
CPC .. *G06F 3/0446* (2019.05); *G06F 2203/04111* (2013.01)

(58) Field of Classification Search
CPC ................... G06F 3/044; G06F 3/0446; G06F 2203/04111
See application file for complete search history.

(56) References Cited

U.S. PATENT DOCUMENTS

| | | | | |
|---|---|---|---|---|
| 9,019,232 | B2 * | 4/2015 | Kang | G06F 3/0446 345/174 |
| 9,916,047 | B2 * | 3/2018 | Jones | G06F 3/0446 |
| 10,347,853 | B2 * | 7/2019 | Park | H01L 51/0023 |
| 10,474,295 | B2 * | 11/2019 | Kim | G06F 3/0412 |
| 10,475,862 | B2 * | 11/2019 | Jeong | G06F 3/0443 |
| 2010/0253646 | A1 * | 10/2010 | Hiratsuka | G06F 3/0445 345/174 |
| 2010/0302201 | A1 * | 12/2010 | Ritter | G06F 3/0446 345/174 |
| 2011/0057893 | A1 | 3/2011 | Kim et al. | |

(Continued)

FOREIGN PATENT DOCUMENTS

| | | |
|---|---|---|
| KR | 10-1082293 | 11/2011 |
| KR | 10-1706234 | 2/2017 |
| KR | 10-2018-0110924 | 10/2018 |

OTHER PUBLICATIONS

Extended European Search Report dated Jul. 23, 2020 issued to European Patent Application No. 20171756.8.

*Primary Examiner* — Amy Onyekaba
(74) *Attorney, Agent, or Firm* — H.C. Park & Associates, PLC

(57) ABSTRACT

An input-sensing circuit may include a plurality of sensors and a plurality of connecting portions to electrically connect the plurality of sensors to each other. Some of the plurality of connecting portions may be disposed in the same layer as the plurality of sensors, and the others may be disposed in a layer different from the plurality of sensors. The connecting portions, which are disposed in the same layer as the plurality of sensors, and the connecting portions, which are disposed in a layer different from the plurality of sensors, may be alternately disposed with respect to each other, when viewed in a plan view.

20 Claims, 15 Drawing Sheets

AA
CP1
IE1
CPU1
CPD1
DMP
IE2
CPD2
CP2
UA
IE2-1
CPU2
IE1-1
BB
IE2-2
IE1-2
DR3
DR1
DR2

(56) References Cited

U.S. PATENT DOCUMENTS

2011/0316567 A1* 12/2011 Chai .................... G06F 3/0445 324/686
2012/0186966 A1* 7/2012 Chang .................. G06F 3/0443 200/600
2013/0270095 A1* 10/2013 Yau ...................... G06F 3/0445 200/600
2014/0078068 A1* 3/2014 Jones ................... G06F 3/0445 345/173
2014/0098304 A1* 4/2014 Kim ..................... G06F 3/0446 349/12
2014/0168147 A1* 6/2014 Huang ................. G06F 3/0448 345/174
2014/0253499 A1* 9/2014 Lee ...................... G06F 3/0448 345/174
2014/0300833 A1* 10/2014 Yang .................... G06F 3/0446 349/12
2015/0193050 A1* 7/2015 Chai ....................... G01D 5/24 345/174
2016/0195983 A1* 7/2016 Miyake .............. G06F 3/04164 345/174
2016/0282992 A1* 9/2016 Song .................... G06F 3/0448
2017/0139525 A1* 5/2017 Jo .......................... G06F 3/046
2017/0147132 A1* 5/2017 Choi .................... G06F 3/0446
2018/0032188 A1* 2/2018 Park ..................... G06F 3/0412
2018/0033830 A1* 2/2018 Kim ..................... G06F 3/0443
2018/0033980 A1* 2/2018 Park ................... G06F 3/04164
2018/0040672 A1* 2/2018 Park ..................... G06F 3/0446
2018/0120988 A1* 5/2018 Kim ..................... G06F 3/0412
2018/0188841 A1* 7/2018 Yu ........................ G06F 3/0443
2018/0246608 A1* 8/2018 Huh ..................... G06F 3/0446
2018/0287092 A1 10/2018 Song et al.
2018/0308903 A1* 10/2018 Jeong ................. H01L 27/3276
2019/0051708 A1* 2/2019 Jeong ................. H01L 51/5281
2019/0064960 A1* 2/2019 Na ....................... G06F 3/0446
2019/0103443 A1* 4/2019 Kim ................... H01L 51/5253
2019/0129551 A1* 5/2019 Lee .................... G02F 1/13338

* cited by examiner

SA-3
IE2
CP2
CPD2
CPU2
CPU1
CP1
CPD1
UA-3
IE1
DR1
DR2
DR3

INPUT-SENSING CIRCUIT AND DISPLAY MODULE INCLUDING THE SAME

CROSS-REFERENCE TO RELATED APPLICATION

This application claims priority from and the benefit of Korean Patent Application No. 10-2019-0049944, filed on Apr. 29, 2019, which is hereby incorporated by reference for all purposes as if fully set forth herein.

BACKGROUND

Field

Exemplary embodiments/implementations of the invention relate to an input-sensing circuit, which is configured to reduce failures caused by static electricity, and a display module including the input-sensing circuit.

Discussion of the Background

Various display devices are being developed for use in multimedia devices, such as televisions, mobile phones, tablet computers, navigation systems, and gaming machines. A keyboard or a mouse is used as input device for the display device.

In recent display devices, the input device includes an input-sensing circuit, which can sense a user's touch event or a pressure exerted by a user.

The input-sensing circuit senses whether a finger of a human or the like is in contact or touch with a screen of the display device. In the input-sensing circuit, a touch event may be detected by various methods (e.g., a resistance-layer method, an optical-sensing method, a capacitance-sensing method, and an ultrasonic wave sensing method). In particular, in the capacitance-sensing method, a change in capacitance, which occurs when an object causing the touch event is in contact with the screen of the display device, is used to determine whether there is the touch even.

The input-sensing circuit includes a plurality of sensors, and damages on connecting portions connecting sensors caused by internal or external static electricity, may cause a failure in the input-sensing circuit.

The above information disclosed in this Background section is only for understanding of the background of the inventive concepts, and, therefore, it may contain information that does not constitute prior art.

SUMMARY

An exemplary embodiment of the inventive concept provides an input-sensing circuit, which is configured to suppress failures caused by static electricity, and a display module including the input-sensing circuit.

According to an exemplary embodiment of the inventive concept, an input-sensing circuit may include a plurality of first sensor groups, a plurality of second sensor groups, a plurality of first connecting portions, a plurality of second connecting portions, and an insulating member.

In an exemplary embodiment, the plurality of first sensor groups may be extended in a first direction and may be arranged in a second direction crossing the first direction, and each of the plurality of first sensor groups may include a plurality of first sensors.

In an exemplary embodiment, the plurality of second sensor groups may be extended in the second direction and may be arranged in the first direction, and each of the plurality of second sensor groups may include a plurality of second sensors, which are electrically separated from the plurality of first sensors.

In an exemplary embodiment, the plurality of first connecting portions may include a plurality of first upside connecting portions and a plurality of first downside connecting portions, and each of the plurality of first connecting portions may electrically connect two adjacent ones of the plurality of first sensors.

In an exemplary embodiment, the plurality of second connecting portions may include a plurality of second upside connecting portions and a plurality of second downside connecting portions, and each of the plurality of second connecting portions may electrically connect two adjacent ones of the plurality of second sensors.

In an exemplary embodiment, the insulating member may cover the plurality of first sensor groups, the plurality of second sensor groups, the plurality of first downside connecting portions, and the plurality of second downside connecting portions, and a plurality of contact holes may be defined in the insulating member.

In an exemplary embodiment, the plurality of first upside connecting portions and the plurality of second upside connecting portions may be electrically connected to the plurality of first sensors and the plurality of second sensors through the plurality of contact holes.

In an exemplary embodiment, the plurality of first upside connecting portions and the plurality of first downside connecting portions may be alternatively arranged with respect to each other in the first direction and the second direction, and the plurality of second upside connecting portions and the plurality of second downside connecting portions may be alternatively arranged with respect to each other in the first direction and the second direction.

In an exemplary embodiment, two ones of the plurality of first downside connecting portions may electrically connect three adjacent ones of the plurality of first sensors. One of the plurality of first upside connecting portions may be electrically connected to one of the three first sensors. Two ones of the plurality of second downside connecting portions may electrically connect three adjacent ones of the plurality of second sensors. One of the plurality of second upside connecting portions may be electrically connected to one of the three second sensors.

In an exemplary embodiment, three ones of the plurality of first downside connecting portions may electrically connect four adjacent ones of the plurality of first sensors. One of the plurality of first upside connecting portions may be electrically connected to one of the four first sensors.

In an exemplary embodiment, three ones of the plurality of second downside connecting portions may electrically connect four adjacent ones of the plurality of second sensors. One of the plurality of second upside connecting portions may be electrically connected to one of the four second sensors.

In an exemplary embodiment, each of the plurality of first sensors and the plurality of second sensors may include a first metal material, and each of the plurality of first connecting portions and the plurality of second connecting portions may include a second metal material different from the first metal material.

In an exemplary embodiment, the first metal material may include indium tin oxide, indium zinc oxide, indium gallium zinc oxide, or zinc oxide, and the second metal material may include molybdenum (Mo).

In an exemplary embodiment, the input-sensing circuit may further include a plurality of first signal lines, a plurality of second signal lines, and a driving circuit. Each of the plurality of first signal lines may be electrically connected to the plurality of first sensor groups and includes the second metal material. Each of the plurality of second signal lines may be electrically connected to the plurality of second sensor groups and includes the second metal material. The driving circuit may be electrically connected to the first signal lines and the second signal lines to sense changes in capacitance between the plurality of first sensors and the second plurality of second sensors.

In an exemplary embodiment, a plurality of openings may be defined in each of the plurality of first sensors and the plurality of second sensors.

According to an exemplary embodiment of the inventive concept, an input-sensing circuit may include a plurality of first sensor groups, a plurality of second sensor groups, a plurality of first connecting portions, and a plurality of second connecting portions.

In an exemplary embodiment, the plurality of first sensor groups may be extended in a first direction and may be arranged in a second direction crossing the first direction, and each of the plurality of first sensor groups may include a plurality of first sensors.

In an exemplary embodiment, the plurality of second sensor groups may be extended in the second direction and may be arranged in the first direction, and each of the plurality of second sensor groups may include a plurality of second sensors electrically separated from the plurality of first sensors. The plurality of second sensor groups may be disposed in the same layer as the plurality of first sensor groups.

In an exemplary embodiment, the plurality of first connecting portions may include a plurality of first sub-connecting portions, which are disposed in the same layer as the plurality of first sensor groups, and a plurality of second sub-connecting portions, which are disposed in a layer different from the plurality of first sub-connecting portions. Each of the plurality of first sub-connecting portions and the plurality of second sub-connecting portions may electrically connect two adjacent ones of the plurality of first sensors.

In an exemplary embodiment, the plurality of second connecting portions may include a plurality of third sub-connecting portions, which are disposed in the same layer as the plurality of first sub-connecting portions, and a plurality of fourth sub-connecting portions, which are disposed in a layer different from the plurality of third sub-connecting portions. Each of the plurality of third sub-connecting portions and the plurality of fourth sub-connecting portions may electrically connect two adjacent ones of the plurality of second sensor.

In an exemplary embodiment, the input-sensing circuit may further include an insulating member covering the plurality of first sensor groups, the plurality of second sensor groups, the plurality of first sub-connecting portions, and the plurality of third sub-connecting portions. The plurality of second sub-connecting portions and the plurality of fourth connecting portions may be disposed on the insulating member.

In an exemplary embodiment, the input-sensing circuit may further include an insulating member covering the plurality of second sub-connecting portions and the plurality of fourth connecting portions. The plurality of first sensor groups, the plurality of second sensor groups, the plurality of first sub-connecting portions, and the plurality of third sub-connecting portions may be disposed on the insulating member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

Figure 1:
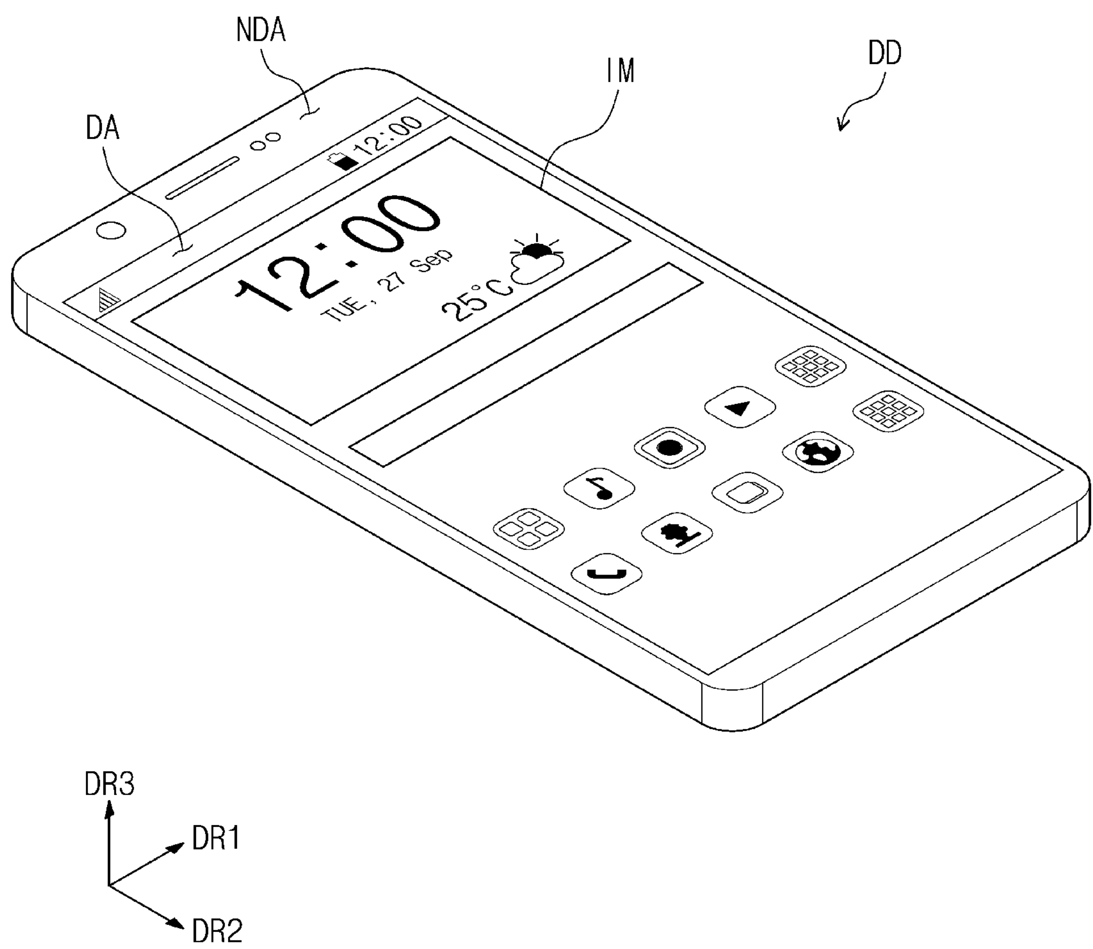
FIG. 1 is a perspective view illustrating a display device according to an exemplary embodiment of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a perspective view illustrating a display device DD according to an exemplary embodiment of the inventive concept.

FIG. 1 illustrates an example in which the display device DD is a smart phone, but the inventive concept is not limited thereto. The display device DD may be used for large-sized electronic devices (e.g., television sets and monitors) or small- or medium-sized electronic devices (e.g., portable phones, tablets, car navigation systems, game consoles, and smart watches).

A display region DA and a non-display region NDA may be defined in the display device DD.

The display region DA, which is used to display an image IM, may be parallel to both of a first direction axis DR1 and a second direction axis DR2. However, the inventive concept is not limited to this example, and in an exemplary embodiment, at least a portion of the display region DA may have a dome shape on a plane defined by the first direction axis DR1 and the second direction axis DR2.

Hereinafter, a third direction axis DR3 will be used to refer to a thickness direction of the display device DD (i.e., a direction normal to a top surface of the display region DA). A front or top surface and a rear or bottom surface of each member may be distinguished, based on the third direction axis DR3. However, directions indicated by the first to third direction axes DR1, DR2, and DR3 may be relative concepts, and in certain embodiments, they may change to indicate other directions. Hereinafter, first to third directions may be directions indicated by the first to third direction axes DR1, DR2, and DR3, respectively, and will be identified with the same reference numbers.

The shape of the display region DA shown in FIG. 1 may be just an example, and the shape of the display region DA may change freely if necessary.

The non-display region NDA may be adjacent to the display region DA and may not show the image IM. A bezel region of the display device DD may be defined by the non-display region NDA.

The non-display region NDA may enclose the display region DA. However, the inventive concept is not limited to this example, and the shapes of the display region DA and the non-display region NDA may change variously in a complementary manner.

Figure 2:
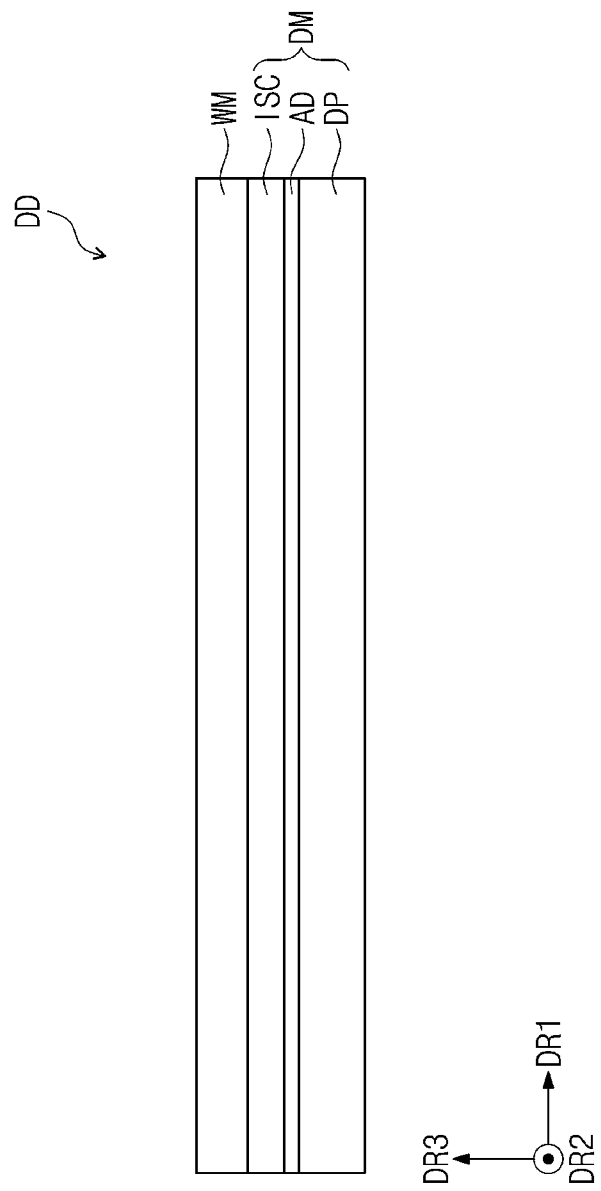
FIG. 2 is a sectional view illustrating a portion of a display device according to an exemplary embodiment of the inventive concept.

FIG. 2 is a sectional view illustrating a portion of the display device DD according to an exemplary embodiment of the inventive concept.

The display device DD may include a display module DM and a window member WM.

The display module DM may include a display panel DP, an input-sensing circuit ISC, and an adhesive member AD.

The display panel DP may be an element to produce an image. The input-sensing circuit ISC may be a circuit to sense a user's touch or outside pressure change.

The display panel DP and the input-sensing circuit ISC may be combined to each other by the adhesive member AD. In an exemplary embodiment, the adhesive member AD may be an optically clear adhesive (OCA) or an optically clear resin (OCR).

The window member WM may include a transparent material. For example, the window member WM may be formed of or include glass or synthetic resin. The window member WM may be combined on the display module DM by a transparent adhesive (not shown).

Figure 3:
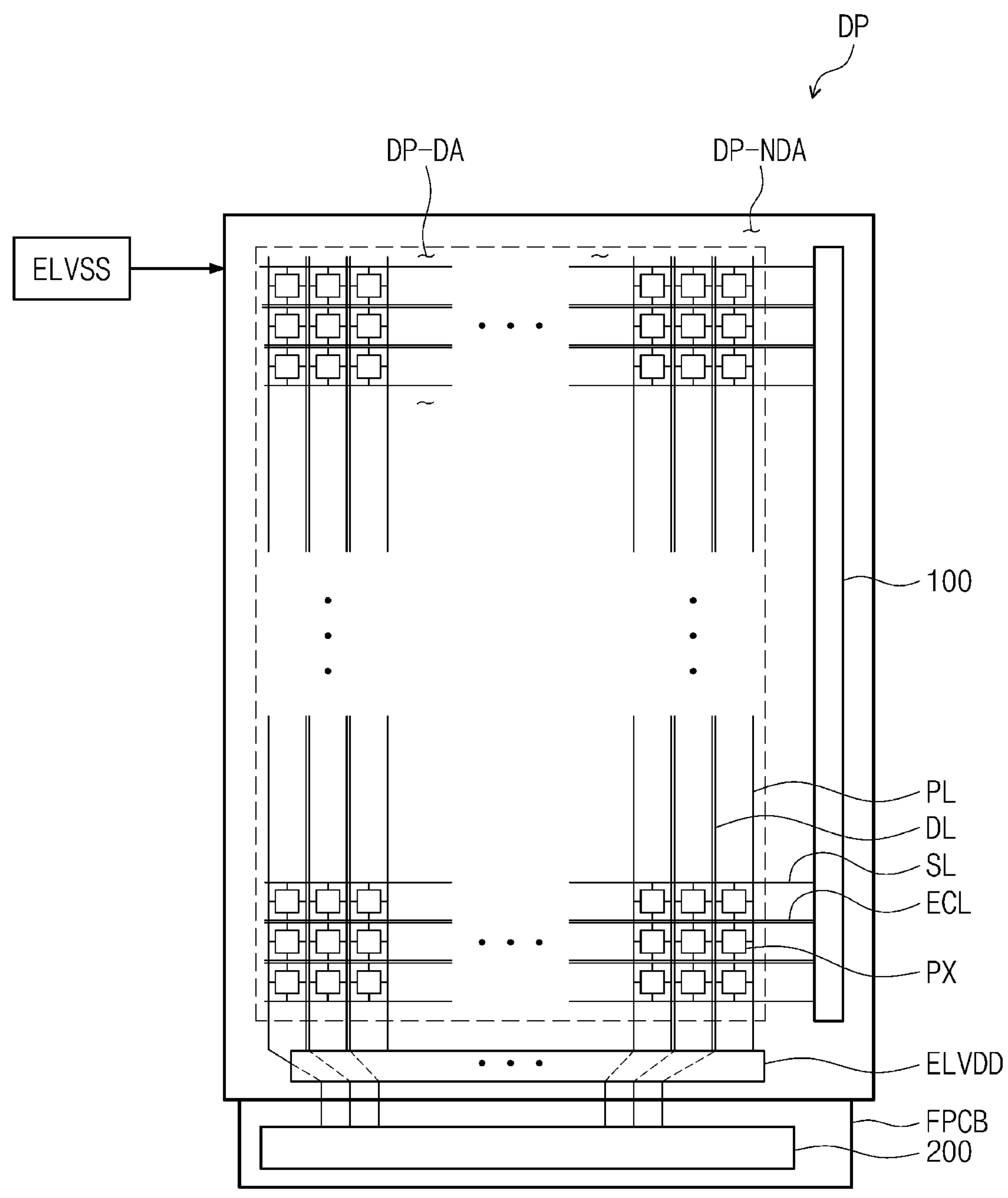
FIG. 3 is a plan view illustrating a display panel according to an exemplary embodiment of the inventive concept.

FIG. 3 is a plan view illustrating the display panel DP according to an exemplary embodiment of the inventive concept.

The display panel DP may include a display region DP-DA and a non-display region DP-NDA, when viewed in a plan view. In the present embodiment, the non-display region DP-NDA may be defined along an edge or outer boundary of the display region DP-DA. The display region DP-DA and the non-display region DP-NDA of the display panel DP may be correspond to the display region DA and the non-display region NDA, respectively, of the display device DD shown in FIG. 1.

The display panel DP may include a scan driver 100, a data driver 200, a plurality of scan lines SL, a plurality of emission control lines ECL, a plurality of data lines DL, a plurality of power lines PL, and a plurality of pixels PX. The pixels PX may be disposed in the display region DP-DA. Each of the pixels PX may include emission element LD (e.g., see FIG. 4) and a pixel circuit CC (e.g., see FIG. 4) connected thereto.

The scan driver 100 may include a scan driving part and an emission control driving part.

The scan driving part may generate scan signals and output the generated scan signals sequentially to the scan lines SL. The emission control driving part may generate emission control signals and output the emission control signals to the emission control lines ECL.

In certain embodiments, the scan driving part and the emission control driving part may be provided as a single circuit, not as separate elements, in the scan driver 100.

The scan driver 100 may include a plurality of thin film transistors that are formed by the same process as that for the driving circuit of the pixels PX (e.g., by a low temperature polycrystalline silicon (LTPS) process or a low temperature polycrystalline oxide (LTPO) process).

The data driver 200 may output data signals to the data lines DL. The data signals may be provided in the form of analog voltages, whose levels are determined based on gradation levels of the image data.

In an exemplary embodiment, the data driver 200 may be mounted on a printed circuit board FPCB, and the printed circuit board FPCB may be connected to pads, which are disposed at the end of the data lines DL. However, the inventive concept is not limited to this example, and the data driver 200 may be directly mounted on the display panel DP.

The scan lines SL may be extended in the first direction DR1 and may be arranged in the second direction DR2.

The emission control lines ECL may be extended in the first direction DR1 and may be arranged in the second direction DR2. In other words, each of the emission control lines ECL may be arranged to be parallel to a corresponding one of the scan lines SL.

The data lines DL may be extended in the second direction DR2 and may be arranged in the first direction DR1. The data lines DL may be used to deliver the data signals to corresponding pixels PX.

The power lines PL may be extended in the second direction DR2 and may be arranged in the first direction DR1. The power lines PL may be used to provide a first power ELVDD to corresponding ones of the pixels PX.

Each of the pixels PX may be coupled to a corresponding one of the scan lines SL, a corresponding one of the emission control lines ECL, a corresponding one of the data lines DL, and a corresponding one of the power lines PL.

Figure 4:
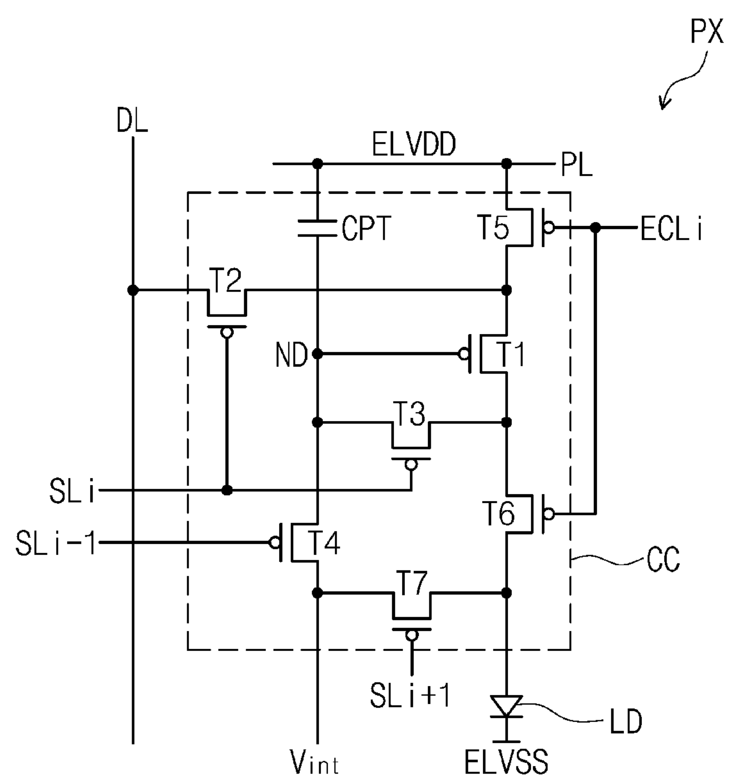
FIG. 4 is an equivalent circuit diagram of a pixel according to an exemplary embodiment of the inventive concept.

FIG. 4 is an equivalent circuit diagram of the pixel PX, according to an exemplary embodiment of the inventive concept.

The pixel PX may include the emission element LD and the pixel circuit CC. The pixel circuit CC may include a plurality of transistors T1-T7 and a capacitor CPT. The pixel circuit CC may control an amount of current flowing through the emission element LD, in response to the data signal.

The emission element LD may emit light, whose brightness is determined by an amount of current to be supplied from the pixel circuit CC. The emission element LD may be an organic light emitting element OLED or a micro LED. The description that follows will refer to an example of the organic light emitting element OLED as the emission element LD.

Although an example of an equivalent circuit of the pixel PX is illustrated in FIG. 4, the kinds of signals provided to the transistors, the number of the transistors, the connection structure between the transistors, or the number of the capacitor may be different.

FIG. 4 illustrates an example in which PMOS transistors are used as the transistors T1-T7, but the inventive concept is not limited to this example. In certain embodiments, NMOS transistors may be used to constitute the pixel PX. In other embodiments, the pixel PX may be configured to include not only NMOS transistors but also PMOS transistors.

Figure 5:
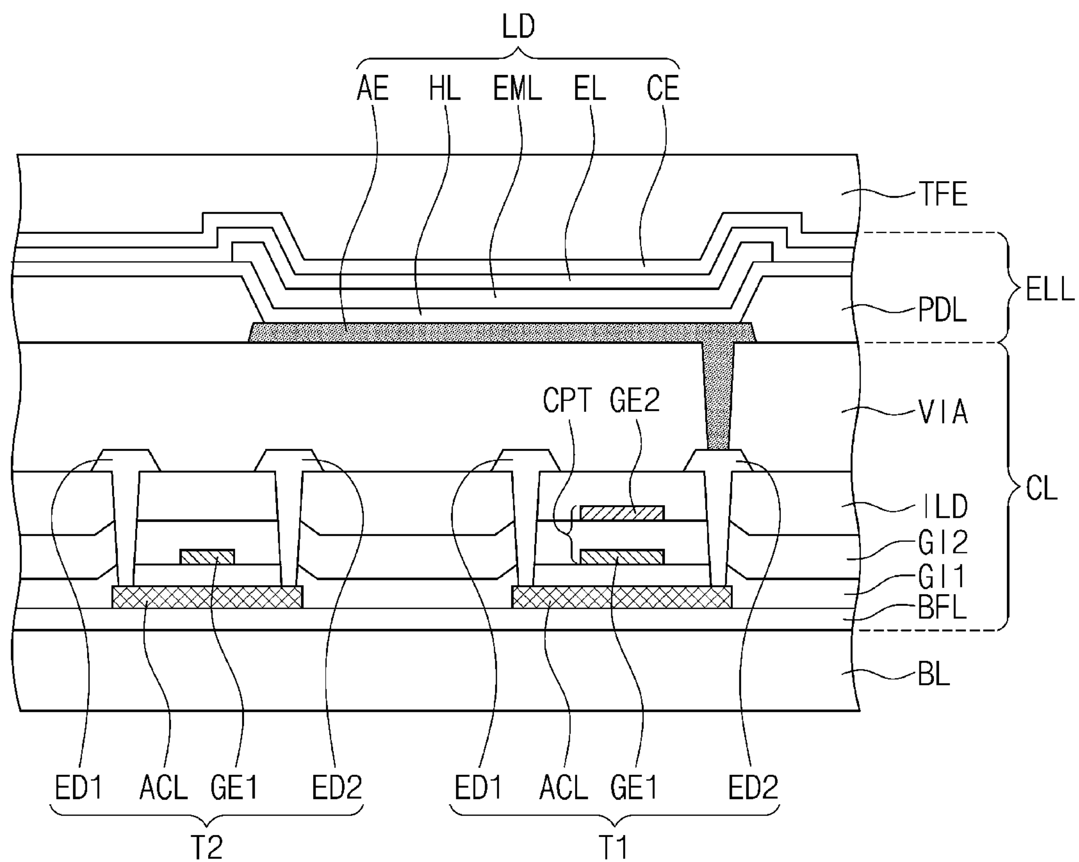
FIG. 5 is a sectional view illustrating a portion of a pixel according to an exemplary embodiment of the inventive concept.

FIG. 5 is a sectional view illustrating a portion of the pixel PX (e.g., see FIG. 4) according to an exemplary embodiment of the inventive concept. FIG. 5 illustrates an example structure of the first transistor T1 and the second transistor T2, but the structures of the first transistor T1 and the second transistor T2 are not limited to this example. In order to reduce complexity in the sectional view, a second electrode ED2 of the first transistor T1 in FIG. 5 is illustrated to be in direct contact with an anode electrode AE of the pixel PX, but in reality, the first transistor T1 may be connected to the anode electrode AE of the pixel PX through the sixth transistor T6, as shown in FIG. 4. However, the inventive concept is not limited to this example, and in an exemplary embodiment, the second electrode ED2 of the first transistor T1 may be in direct contact with the anode electrode AE of the pixel PX.

The display panel DP (e.g., see FIG. 3) may include a base layer BL, a circuit layer CL, an emission element layer ELL, and an encapsulation layer TFE.

The circuit layer CL may include a buffer layer BFL, gate insulating layers GI1 and GI2, an interlayered insulating layer ILD, a circuit insulating layer VIA, and transistors T1 and T2.

The emission element layer ELL may include the emission element LD and a pixel definition layer PDL.

The encapsulation layer TFE may seal the emission element layer ELL and may protect the emission element layer ELL from external oxygen or moisture.

The buffer layer BFL may be disposed on a surface of the base layer BL.

The buffer layer BFL may prevent a contamination material in the base layer BL from entering the pixel PX during the fabrication process. For example, the buffer layer BFL may prevent the contamination material from being diffused into active portions ACL of the transistors T1 and T2 constituting the pixel PX.

The contamination material may come from outside or may be produced when performing a thermal process on the base layer BL. For example, the contamination material may be gas or sodium, exhausting from the base layer BL. In addition, the buffer layer BFL may prevent external moisture from entering the pixel PX.

The active portions ACL constituting the transistors T1 and T2 may be provided on the buffer layer BFL. Each of the active portions ACL may be formed of or include poly silicon or amorphous silicon. In certain embodiments, the active portions ACL may be formed of or include at least one of metal oxide semiconductor materials.

Each of the active portions ACL may include a channel region, which is used as a conduction path of electrons or holes, and a first doped region and a second doped region, which are spaced apart from each other with the channel region interposed therebetween.

A first gate insulating layer GI1 may be disposed on the buffer layer BFL to cover the active portions ACL. The first gate insulating layer GI1 may include an organic layer and/or an inorganic layer. In an exemplary embodiment, the first gate insulating layer GI1 may include a plurality of inorganic layers. The plurality of inorganic layers may include a silicon nitride layer and a silicon oxide layer.

The transistors T1 and T2 may include control electrodes GE1 that are provided on the first gate insulating layer GI1. The control electrode GE1 of the first transistor T1 may be one of two electrodes constituting the capacitor CPT. At least a portion of the scan and emission control lines SL and ECL (e.g., see FIG. 3) may be disposed on the first gate insulating layer GI1.

A second gate insulating layer GI2 may be disposed on the first gate insulating layer GI1 to cover the control electrodes GE1. The second gate insulating layer GI2 may include an organic layer and/or an inorganic layer. The second gate insulating layer GI2 may include a plurality of inorganic layers. The plurality of inorganic layers may include a silicon nitride layer and a silicon oxide layer.

An electrode GE2, which is used as the other of the two electrodes constituting the capacitor CPT (e.g., see FIG. 4), may be disposed on the second gate insulating layer GI2. In other words, the control electrode GE1 on the first gate insulating layer GI1 and the electrode GE2 on the second gate insulating layer GI2 may be overlapped with each other to constitute the capacitor CPT of FIG. 4. However, the disposition or structure of the electrodes constituting the capacitor CPT is not limited to this example.

The interlayered insulating layer ILD may be disposed on the second gate insulating layer GI2 to cover the electrode GE2. The interlayered insulating layer ILD may include an organic layer and/or an inorganic layer. The interlayered insulating layer ILD may include a plurality of inorganic thin films. The plurality of inorganic layers may include a silicon nitride layer and a silicon oxide layer.

At least one portion of the data and power lines DL and PL (e.g., see FIG. 3) may be disposed on the interlayered insulating layer ILD. First electrodes ED1 and second electrodes ED2 of the transistors T1 and T2 may be disposed on the interlayered insulating layer ILD.

The first electrodes ED1 and the second electrodes ED2 may be connected to corresponding portions of the active portions ACL through contact holes, which are formed to penetrate the gate insulating layers GI1 and GI2 and the interlayered insulating layer ILD.

The circuit insulating layer VIA may be disposed on the interlayered insulating layer ILD to cover the first electrodes ED1 and the second electrodes ED2. The circuit insulating layer VIA may include an organic layer and/or an inorganic layer. The circuit insulating layer VIA may provide a flat surface.

The pixel definition layer PDL and the emission element LD may be disposed on the circuit insulating layer VIA.

The emission element LD may include the anode electrode AE, a hole control layer HL, an emission layer EML, an electron control layer EL, and a cathode electrode CE.

Figure 6:
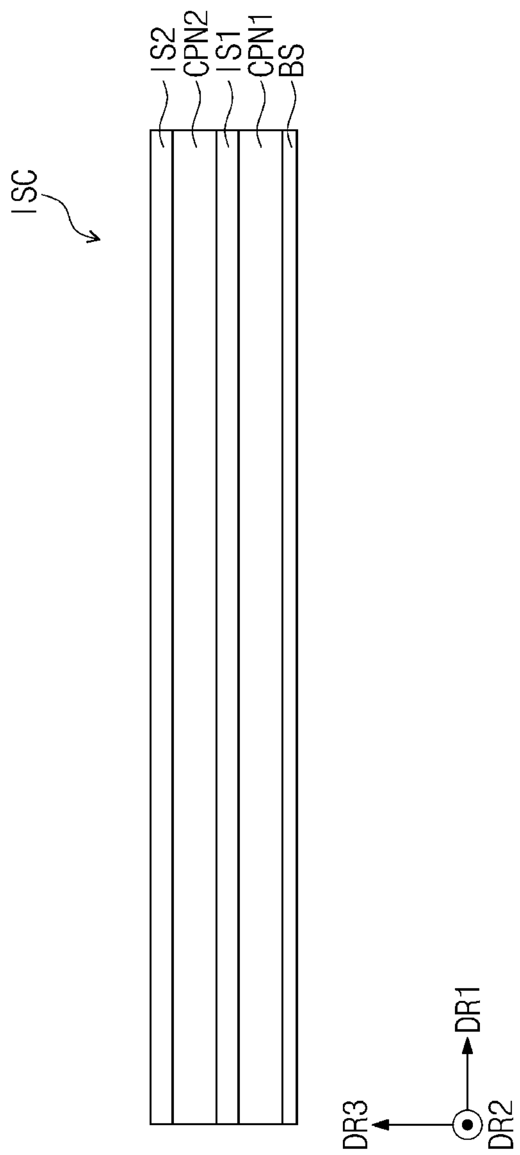
FIG. 6 is a sectional view illustrating an input-sensing circuit according to an exemplary embodiment of the inventive concept.

FIG. 6 is a sectional view illustrating the input-sensing circuit ISC according to an exemplary embodiment of the inventive concept.

As shown in FIG. 6, the input-sensing circuit ISC may include a base portion BS, a first conductive pattern CPN1, a first insulating layer IS1, a second conductive pattern CPN2, and a second insulating layer IS2.

The base portion BS may include polyimide (PI), polyethylene terephthalate (PET), or silicon nitride (SiNx).

The second conductive pattern CPN2 may be disposed to cross a portion of the first conductive pattern CPN1 and may be electrically disconnected from the portion of the first conductive pattern CPN1 by the first insulating layer IS1 interposed therebetween. The second conductive pattern CPN2 may be electrically connected to another portion of the first conductive pattern CPN1 through contact holes CH1 (e.g., see FIG. 9A) defined in the first insulating layer IS1.

Each of the first conductive pattern CPN1 and the second conductive pattern CPN2 may have a single-layered structure or a multi-layered structure, which includes a plurality of layers stacked in the third direction axis DR3.

Each of the first insulating layer IS1 and the second insulating layer IS2 may be formed of or include an organic material or an inorganic material.

The inventive concept is not limited to a specific shape of the first insulating layer IS1, as long as the first insulating layer IS1 disconnects at least a portion of the first conductive pattern CPN1 electrically from the second conductive pattern CPN2.

Figure 7:
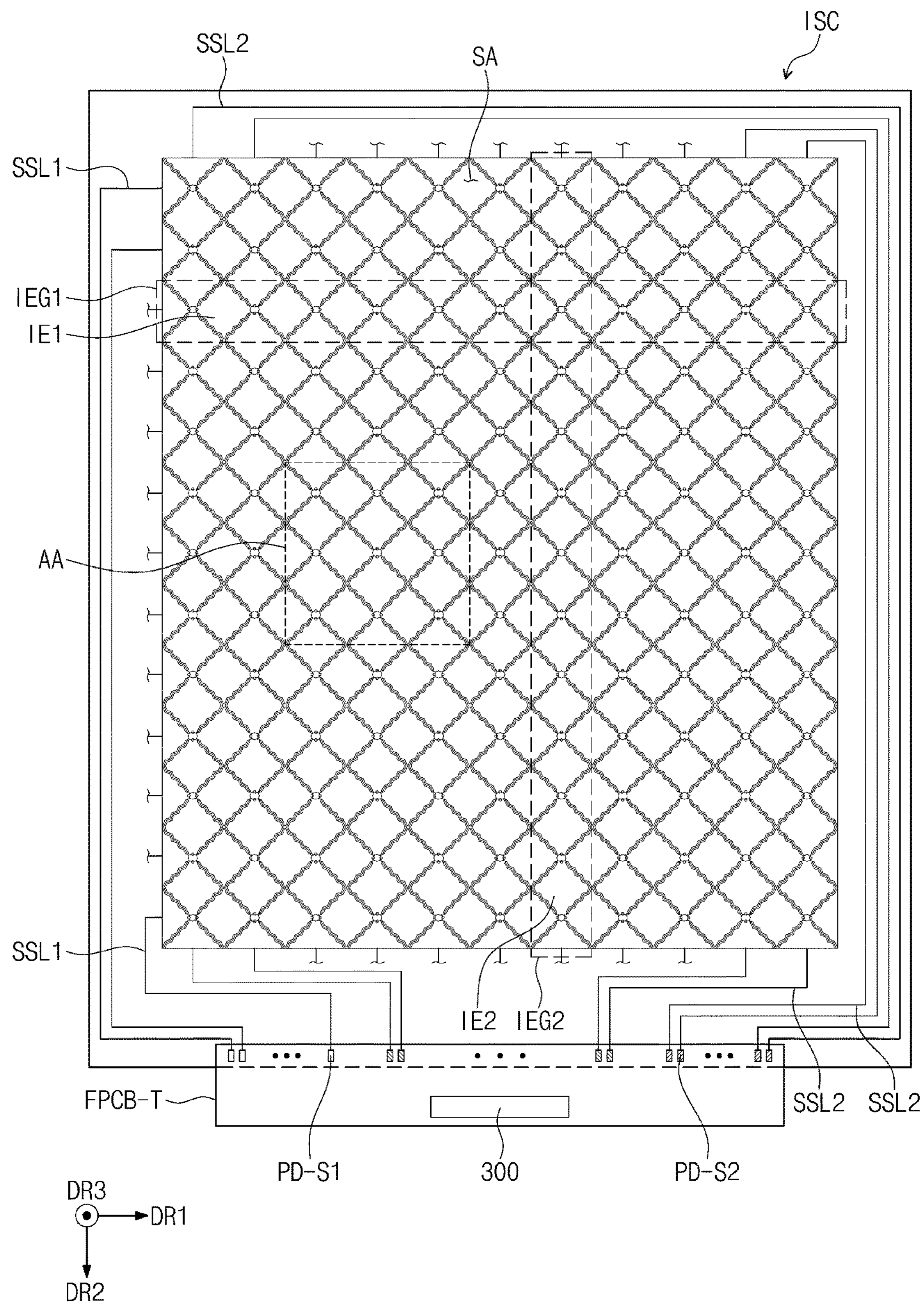
FIG. 7 is a plan view illustrating an input-sensing circuit according to an exemplary embodiment of the inventive concept.
Figure 8:
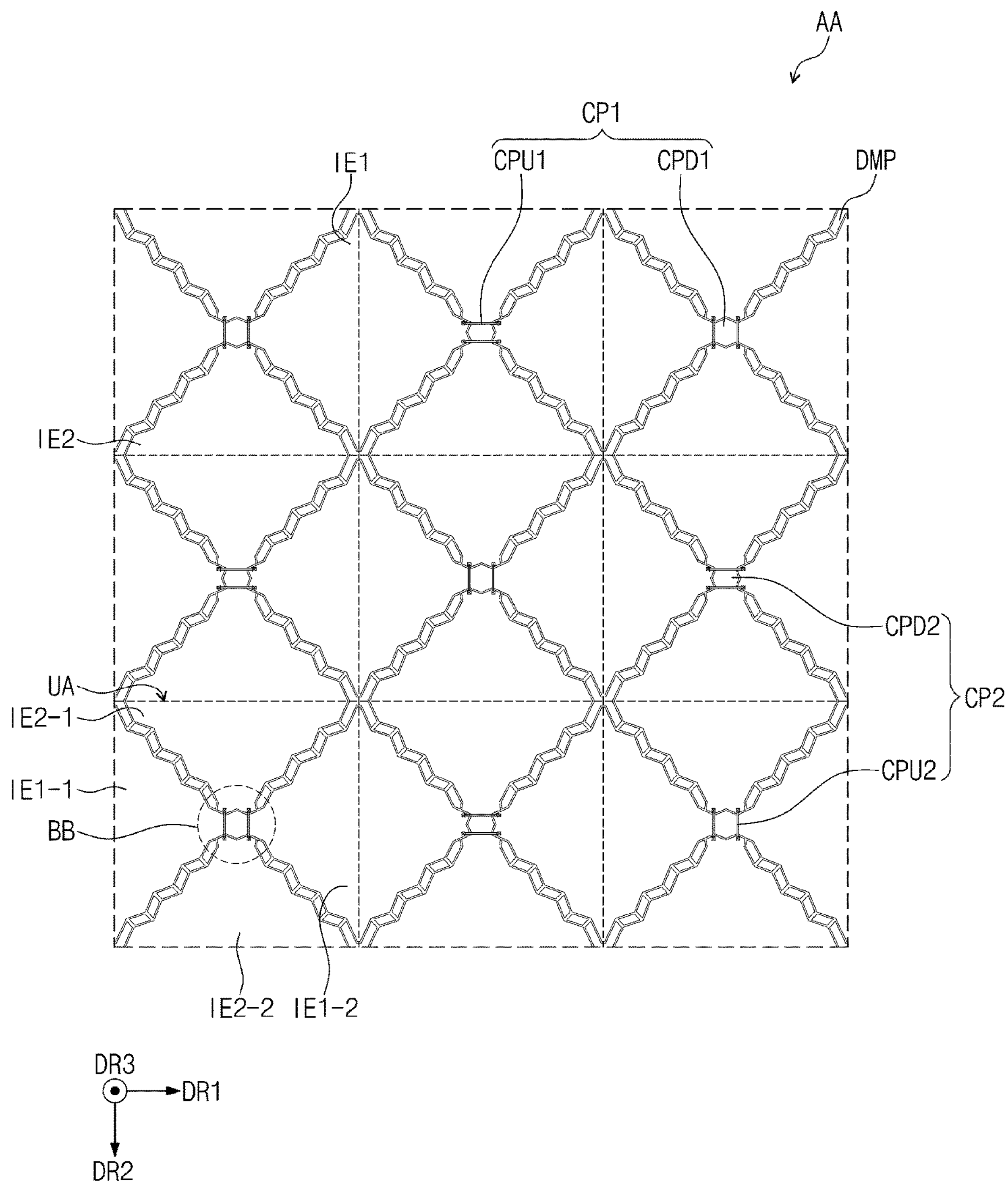
FIG. 8 is an enlarged plan view illustrating a portion AA of FIG. 7.
Figure 9A:
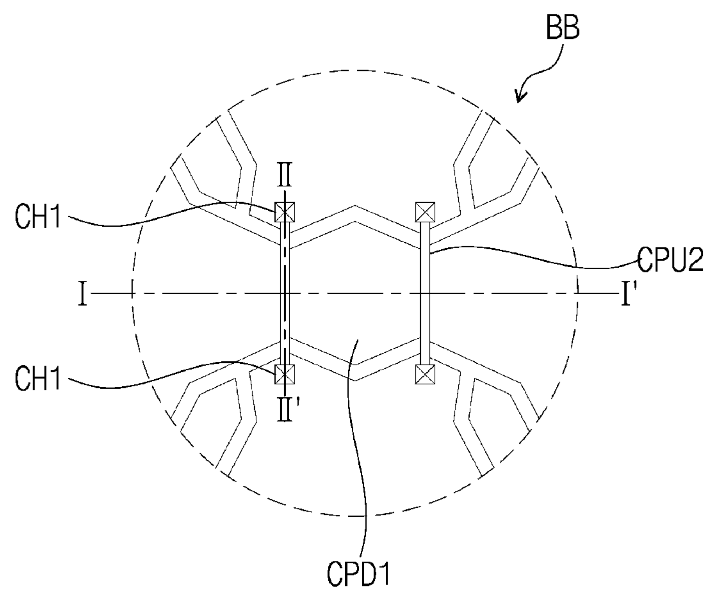
FIG. 9A is an enlarged plan view illustrating a portion BB of FIG. 8.
Figure 9A:
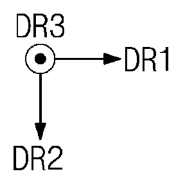
Figure 9B:
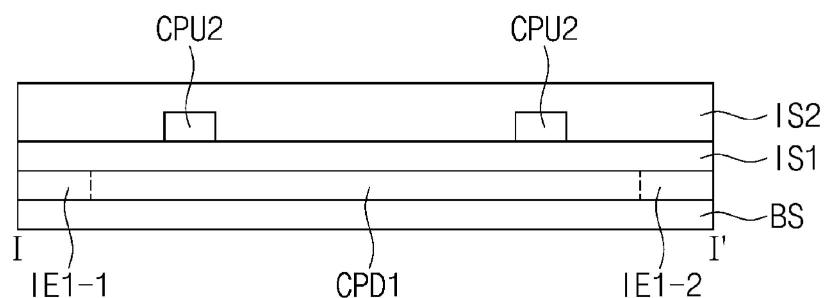
FIG. 9B is a sectional view, taken along a line of FIG. 9A.
Figure 9B:
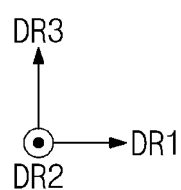
Figure 9C:
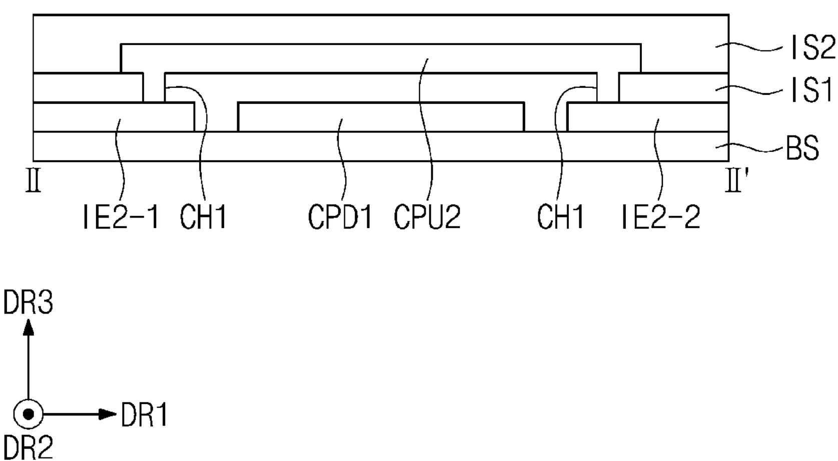
FIG. 9C is a sectional view, taken along a line II-II' of FIG. 9A.

FIG. 7 is a plan view illustrating the input-sensing circuit ISC according to an exemplary embodiment of the inventive concept. FIG. 8 is an enlarged plan view illustrating a portion AA of FIG. 7. FIG. 9A is an enlarged plan view illustrating a portion BB of FIG. 8. FIG. 9B is a sectional view, taken along a line of FIG. 9A. FIG. 9C is a sectional view, taken along a line II-IF of FIG. 9A.

An input-sensing region SA, which is a region to sense an external input, may be defined in the input-sensing circuit ISC.

The input-sensing circuit ISC may include first sensor groups IEG1, second sensor groups IEG2, first connecting portions CP1, second connecting portions CP2, first signal lines SSL1, second signal lines SSL2, signal pads PD-S1 and PD-S2, a printed circuit board FPCB-T, and an input-sensing driving part 300.

Each of the first sensor groups IEG1 may be extended in the first direction DR1, and the first sensor groups IEG1 may be arranged in the second direction DR2. Each of the first sensor groups IEG1 may include a plurality of first sensors IE1. The first sensors IE1 may be arranged in the first direction DR1. For example, the first sensor IE1 may be an Rx sensor.

Each of the second sensor groups IEG2 may be extended in the second direction DR2, and the second sensor groups IEG2 may be arranged in the first direction DR1. Each of the second sensor groups IEG2 may include a plurality of second sensors IE2. The second sensors IE2 may be arranged in the second direction DR2. For example, the second sensor IE2 may be a Tx sensor.

In an exemplary embodiment, each of the first sensors IE1 and the second sensors IE2 may be formed of or include at least one of indium tin oxide (ITO), indium zinc oxide (IZO), indium gallium zinc oxide (IGZO), or zinc oxide (ZnO). However, the inventive concept is not limited to this example, and in an exemplary embodiment, each of the first sensors IE1 and the second sensors IE2 may include molybdenum (Mo).

In an exemplary embodiment, each of the first sensors IE1 may be capacitively coupled with ones of the second sensors IE2 adjacent thereto to form a capacitor. The input-sensing circuit ISC may sense a change in capacitance between the first sensors IE1 and the second sensors IE2 and may determine whether an outside input is provided.

Referring to FIGS. 7 and 8, dummy patterns DMP may be disposed between the first sensors IE1 and the second sensors IE2. The dummy patterns DMP may be spaced apart from the first sensors IE1 and the second sensors IE2. The dummy patterns DMP may be electrically separated from the first sensors IE1 and the second sensors IE2. Since the dummy patterns DMP are disposed, a boundary region between the first sensors IE1 and the second sensors IE2 may not be recognized by a user.

In an exemplary embodiment, the dummy patterns DMP may be formed of or include at least one of indium tin oxide (ITO), indium zinc oxide (IZO), indium gallium zinc oxide (IGZO), or zinc oxide (ZnO).

The first signal lines SSL1 may be electrically connected to the first sensor groups IEG1, respectively. The second signal lines SSL2 may be electrically connected to the second sensor groups IEG2, respectively.

The first signal pads PD-S1 may be connected to the first signal lines SSL1. The second signal pads PD-S2 may be connected to the second signal lines SSL2.

The printed circuit board FPCB-T may be electrically connected to the signal pads PD-S1 and PD-S2.

The input-sensing driving part 300 may be mounted on the printed circuit board FPCB-T. The input-sensing driving part 300 may transmit/receive or process an electrical signal to determine whether a user touched in the input-sensing region SA.

Referring to FIG. 8, the first connecting portions CP1 may include first downside connecting portions CPD1 and first upside connecting portions CPU1. Each of the first downside connecting portions CPD1 and the first upside connecting portions CPU1 may electrically connect two adjacent ones of the first sensors IE1 to each other.

The second connecting portions CP2 may include second downside connecting portions CPD2 and second upside connecting portions CPU2. Each of the second downside connecting portions CPD2 and the second upside connecting portions CPU2 may electrically connect two adjacent ones of the second sensors IE2 to each other.

In an exemplary embodiment, the first downside connecting portions CPD1 and the second downside connecting portions CPD2 may be disposed in the same layer as the sensors IE1 and IE2, and the first upside connecting portions CPU1 and the second upside connecting portions CPU2 may be disposed in a layer different from the sensors IE1 and IE2.

In an exemplary embodiment, the sensors IE1 and IE2, the first downside connecting portions CPD1, and the second downside connecting portions CPD2 may be portions of the first conductive pattern CPN1, and the first upside connecting portions CPU1 and the second upside connecting portions CPU2 may be portions of the second conductive pattern CPN2. However, the inventive concept is not limited to this example, and in certain embodiments, the sensors IE1 and IE2, the first downside connecting portions CPD1, and the second downside connecting portions CPD2 may be portions of the second conductive pattern CPN2, and the first upside connecting portions CPU1 and the second upside connecting portions CPU2 may be portions of the first conductive pattern CPN1.

In the present specification, the first downside connecting portion CPD1 may be referred to as a first sub-connecting portion, the first upside connecting portion CPU1 may be referred to as a second sub-connecting portion, the second downside connecting portion CPD2 may be referred to as a third sub-connecting portion, and the second upside connecting portion CPU2 may be referred to as a fourth sub-connecting portion.

Referring to FIGS. 7 and 8, the first downside connecting portions CPD1 and the first upside connecting portions CPU1 may be alternately disposed in at least one of the first and second directions DR1 and DR2. In other words, each of the first upside connecting portions CPU1 may be disposed between the first downside connecting portions CPD1.

Referring to FIGS. 7 and 8, the second downside connecting portions CPD2 and the second upside connecting portions CPU2 may be alternately disposed in at least one of the first and second directions DR1 and DR2. In other words, each of the second upside connecting portions CPU2 may be disposed between the second downside connecting portions CPD2.

Referring to FIGS. 7 and 8, an area of the first sensors IE1, which are electrically connected to each other by the first downside connecting portion CPD1 may be substantially the same as an area of the second sensors IE2, which are electrically connected to each other by the second downside connecting portion CPD2. Conventionally, the larger a difference in area between the sensors IE1 and IE2 disposed in the same layer, the higher the risk of failures by an electrostatic discharge (ESD) issue. Thus, in the case where, like the embodiments of the inventive concept, the difference in area between the sensors IE1 and IE2 disposed in the same layer is decreased, it may be possible to reduce the risk of the failure by the ESD issue.

The input-sensing region SA may include a plurality of unit regions UA.

A left first sensor IE1-1, a right first sensor IE1-2, a top second sensor IE2-1, and a bottom second sensor IE2-2 may be disposed in the unit region UA.

In the unit region UA, the first sensors IE1-1 and IE1-2 and the second sensors IE2-1 and IE2-2 may be capacitively coupled to each other to form capacitors.

The left first sensor IE1-1 and the right first sensor IE1-2 may be electrically connected to each other by the first connecting portion CP1. FIG. 9A illustrates an example, in which the left first sensor IE1-1 and the right first sensor IE1-2 are electrically connected to each other by the first downside connecting portion CPD1. The left first sensor IE1-1, the right first sensor IE1-2, and the first downside connecting portion CPD1 may be disposed in the same layer.

The top second sensor IE2-1 and the bottom second sensor IE2-2 may be electrically connected to each other by the second connecting portion CP2. FIG. 9A illustrates an example, in which the top second sensor IE2-1 and the bottom second sensor IE2-2 are electrically connected to each other by the second upside connecting portion CPU2. At least a portion of the second upside connecting portion CPU2 may be disposed in a layer different from the top second sensor IE2-1 and the bottom second sensor IE2-2.

Referring to FIGS. 9B and 9C, the first sensors IE1-1 and IE1-2, the second sensors IE2-1 and IE2-2, and the first downside connecting portion CPD1 may be disposed on the base portion BS.

The first insulating layer IS1 may be disposed on the base portion BS to cover the first sensors IE1-1 and IE1-2, the second sensors IE2-1 and IE2-2, and the first downside connecting portion CPD1. The first contact holes CH1 may be defined in the first insulating layer IS1.

At least a portion of each of the second upside connecting portions CPU2 may be disposed on the first insulating layer IS1. The second upside connecting portions CPU2 may be electrically connected to the second sensors IE2-1 and IE2-2 through the first contact holes CH1.

The second insulating layer IS2 may be disposed on the first insulating layer IS1 to cover the second upside connecting portions CPU2.

Each of the first insulating layer IS1 and the second insulating layer IS2 may be formed of or include an organic material or an inorganic material.

In certain embodiments, the base portion BS shown in FIGS. 9B and 9C may be replaced with the encapsulation layer TFE (e.g., see FIG. 5) of the display panel DP.

Figure 10:
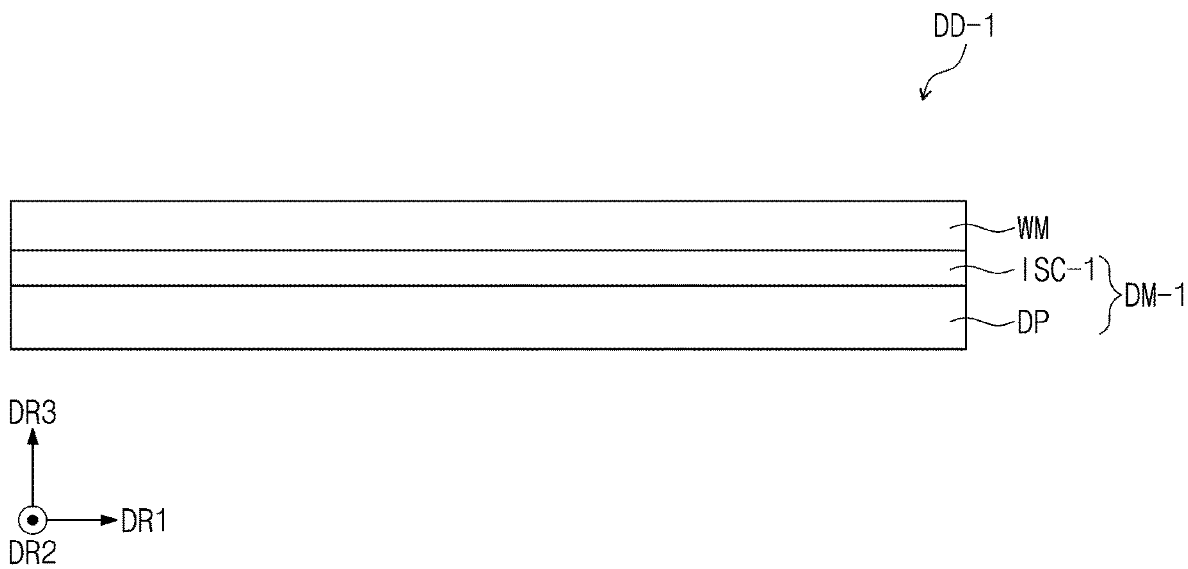
FIG. 10 is a sectional view illustrating a display device according to an exemplary embodiment of the inventive concept.
Figure 11:
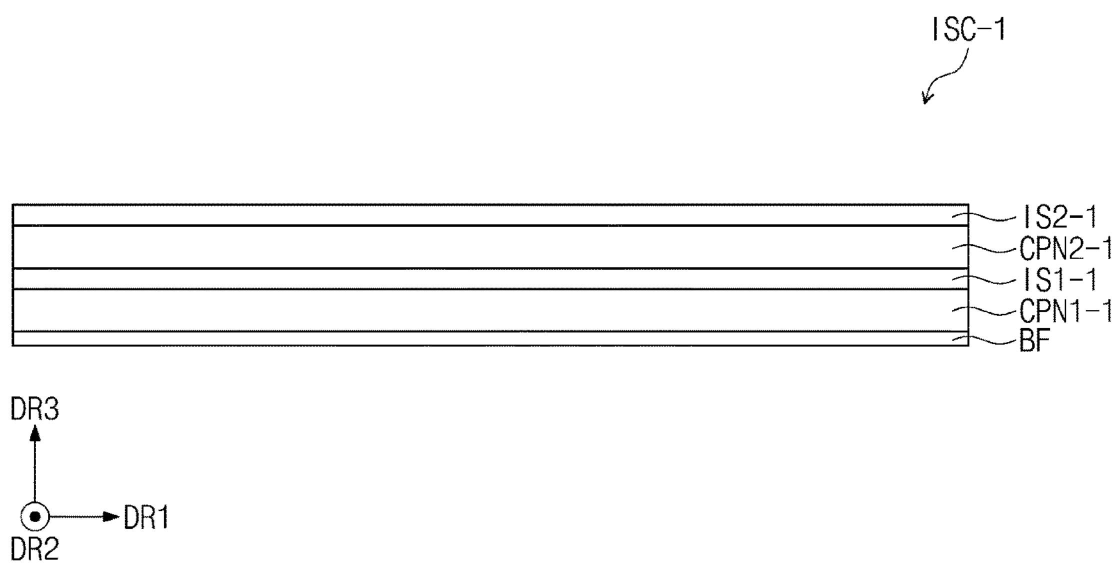
FIG. 11 is a sectional view illustrating an input-sensing circuit according to an exemplary embodiment of the inventive concept.

FIG. 10 is a sectional view illustrating a display device DD-1 according to an exemplary embodiment of the inventive concept. FIG. 11 is a sectional view illustrating an input-sensing circuit ISC-1 according to an exemplary embodiment of the inventive concept.

The display device DD-1 may include a display module DM-1 and the window member WM. The display module DM-1 may include the display panel DP and the input-sensing circuit ISC-1. The input-sensing circuit ISC-1 may be directly disposed on a surface of the display panel DP. In the present specification, the expression "an element is directly disposed on another element" may mean that an additional adhesive layer or member is not disposed between the two elements.

In an exemplary embodiment, the input-sensing circuit ISC-1 may include a silicon-buffer layer BF, a first conductive pattern CPN1-1, a first insulating layer IS1-1, a second conductive pattern CNP2-1, and a second insulating layer IS2-1.

The silicon-buffer layer BF may include silicon nitride (SiNx).

The first conductive pattern CPN1-1 and the second conductive pattern CNP2-1 may be formed of or include a conductive material.

Figure 12:
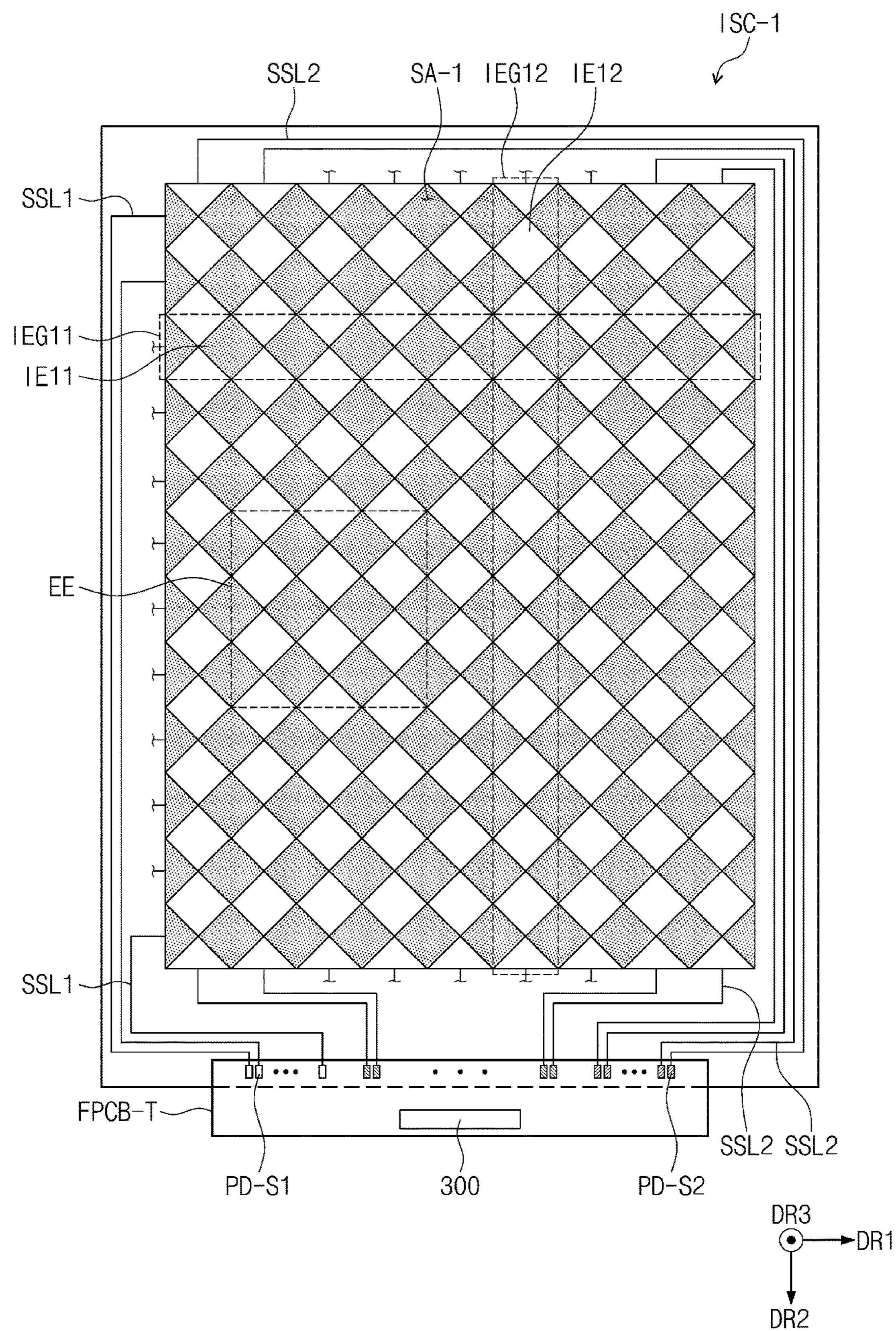
FIG. 12 is a plan view illustrating an input-sensing circuit according to an exemplary embodiment of the inventive concept.
Figure 13:
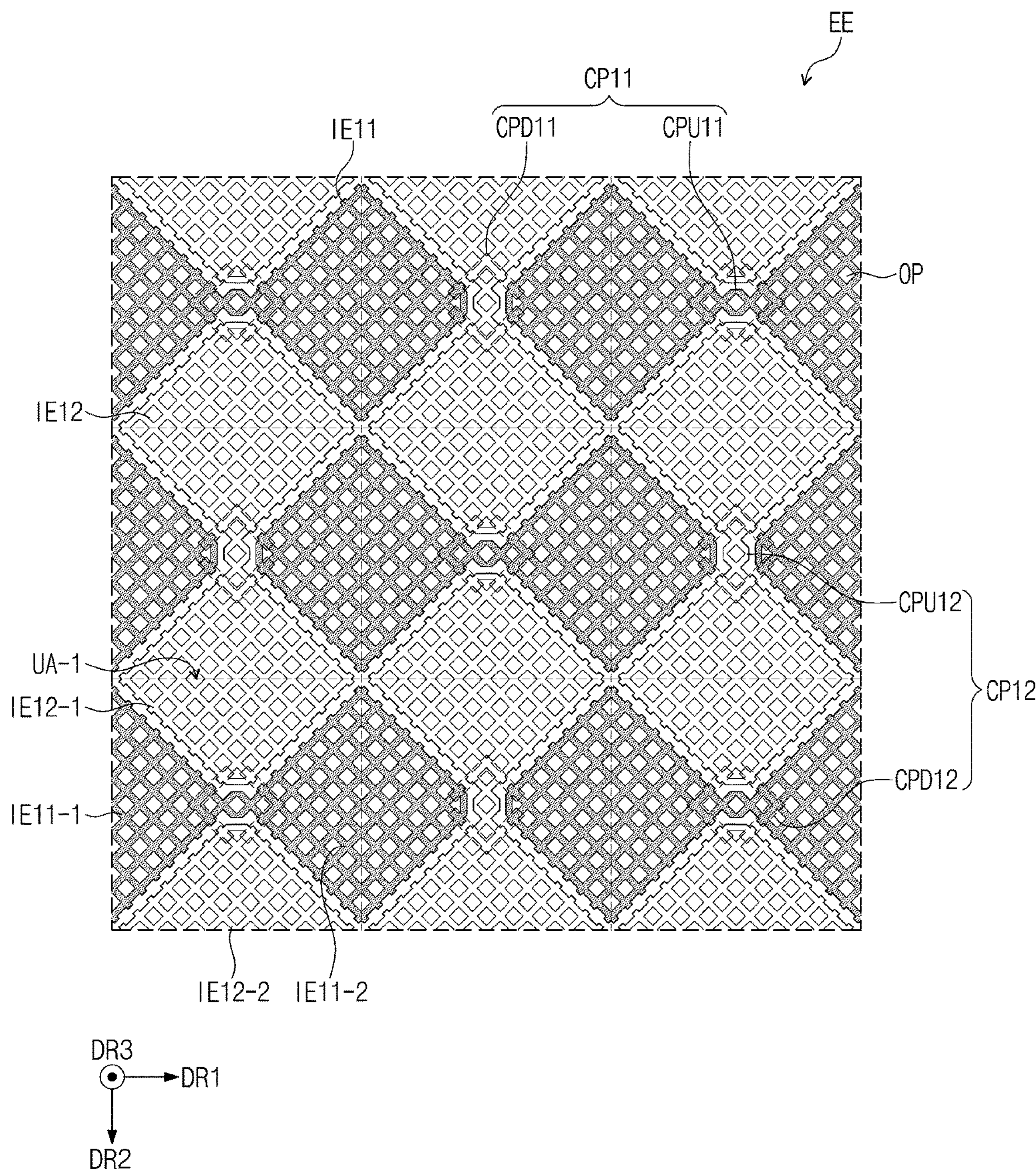
FIG. 13 is an enlarged plan view illustrating a portion EE of FIG. 12.

Each of the first insulating layer IS1 and the second insulating layer IS2 may be formed of or include an organic material or an inorganic material FIG. 12 is a plan view illustrating an input-sensing circuit ISC-1 according to an exemplary embodiment of the inventive concept. FIG. 13 is an enlarged plan view illustrating a portion EE of FIG. 12.

The input-sensing circuit ISC-1 may include first sensor groups IEG11, second sensor groups IEG12, first connecting portions CP11, second connecting portions CP12, the first signal lines SSL1, the second signal lines SSL2, the signal pads PD-S1 and PD-S2, the printed circuit board FPCB-T, and the input-sensing driving part 300.

Each of the first sensor groups IEG11 may be extended in the first direction DR1, and the first sensor groups IEG11 may be arranged in the second direction DR2. Each of the first sensor groups IEG11 may include a plurality of first sensors IE11. The first sensors IE11 may be arranged in the first direction DR1. For example, the first sensor IE11 may be an Rx sensor.

Each of the second sensor groups IEG12 may be extended in the second direction DR2, and the second sensor groups IEG12 may be arranged in the first direction DR1. Each of the second sensor groups IEG12 may include a plurality of second sensors IE12. The second sensors IE12 may be arranged in the second direction DR2. For example, the second sensor IE12 may be a Tx sensor.

A plurality of openings OP may be defined in each of the sensors IE11 and IE12. The openings OP may correspond to the emission elements LD (e.g., see FIG. 4), respectively, of the display panel DP (e.g., see FIG. 3). Lights emitted from the emission elements LD (e.g., see FIG. 4) may pass through the openings OP and may be recognized by users.

Other elements of the input-sensing circuit ISC-1 may have substantially the same features as those in the input-sensing circuit ISC of FIG. 7, and such an element may be identified by a similar or identical reference number without repeating an overlapping description thereof.

Referring to FIG. 13, the first connecting portions CP11 may include first downside connecting portions CPD11 and first upside connecting portions CPU11. Each of the first downside connecting portions CPD11 and the first upside connecting portions CPU11 may electrically connect two adjacent ones of the first sensors IE11 to each other.

The second connecting portions CP12 may include second downside connecting portions CPD12 and second upside connecting portions CPU12. Each of the second downside connecting portions CPD12 and the second upside connecting portions CPU12 may electrically connect two adjacent ones of the second sensors IE12 to each other.

In an exemplary embodiment, the first downside connecting portions CPD11 and the second downside connecting portions CPD12 may be disposed in a layer different from the sensors IE11 and IE12, and the first upside connecting portions CPU11 and the second upside connecting portions CPU12 may be disposed in the same layer as the sensors IE1 and IE2.

In an exemplary embodiment, the sensors IE11 and IE12, the first upside connecting portions CPU11, and the second upside connecting portions CPU12 may be portions of a second conductive pattern CPN2-1, and the first downside connecting portions CPD1 and the second downside connecting portions CPD2 may be portions of the first conductive pattern CPN1-1.

However, the inventive concept is not limited to this example, and in certain embodiments, the sensors IE11 and IE12, the first upside connecting portions CPU11, and the second upside connecting portions CPU12 may be portions of the first conductive pattern CPN1-1, and the first downside connecting portions CPD1 and the second downside connecting portions CPD2 may be portions of the second conductive pattern CPN2-1.

In the present specification, the first downside connecting portion CPD11 may be referred to as a first sub-connecting portion, the first upside connecting portion CPU11 may be referred to as a second sub-connecting portion, the second downside connecting portion CPD12 may be referred to as a third sub-connecting portion, and the second upside connecting portion CPU12 may be referred to as a fourth sub-connecting portion.

Referring to FIG. 13, the first downside connecting portions CPD11 and the first upside connecting portions CPU11 may be alternately disposed in at least one of the first and second directions DR1 and DR2. In other words, each of the first upside connecting portions CPU11 may be disposed between the first downside connecting portions CPD11.

Referring to FIG. 13, the second downside connecting portions CPD12 and the second upside connecting portions CPU12 may be alternately disposed in at least one of the first and second directions DR1 and DR2. In other words, each of the second upside connecting portions CPU12 may be disposed between the second downside connecting portions CPD12.

An input-sensing region SA-1 may include a plurality of unit regions UA-1.

A left first sensor IE11-1, a right first sensor IE11-2, a top second sensor IE12-1, and a bottom second sensor IE12-2 may be disposed in the unit region UA-1.

In the unit region UA-1, the first sensors IE11-1 and IE11-2 and the second sensors IE12-1 and IE12-2 may be capacitively coupled to each other to form capacitors.

The left first sensor IE11-1 and the right first sensor IE11-2 may be electrically connected to each other by the first connecting portion CP11. The left first sensor IE11-1, the right first sensor IE11-2, and the first upside connecting portion CPU11 may be disposed in the same layer.

The top second sensor IE12-1 and the bottom second sensor IE12-2 may be electrically connected to each other by second connecting portion CP12. The second downside connecting portion CPD12 may be disposed in a layer different from the top second sensor IE12-1 and the bottom second sensor IE12-2.

Figure 14:
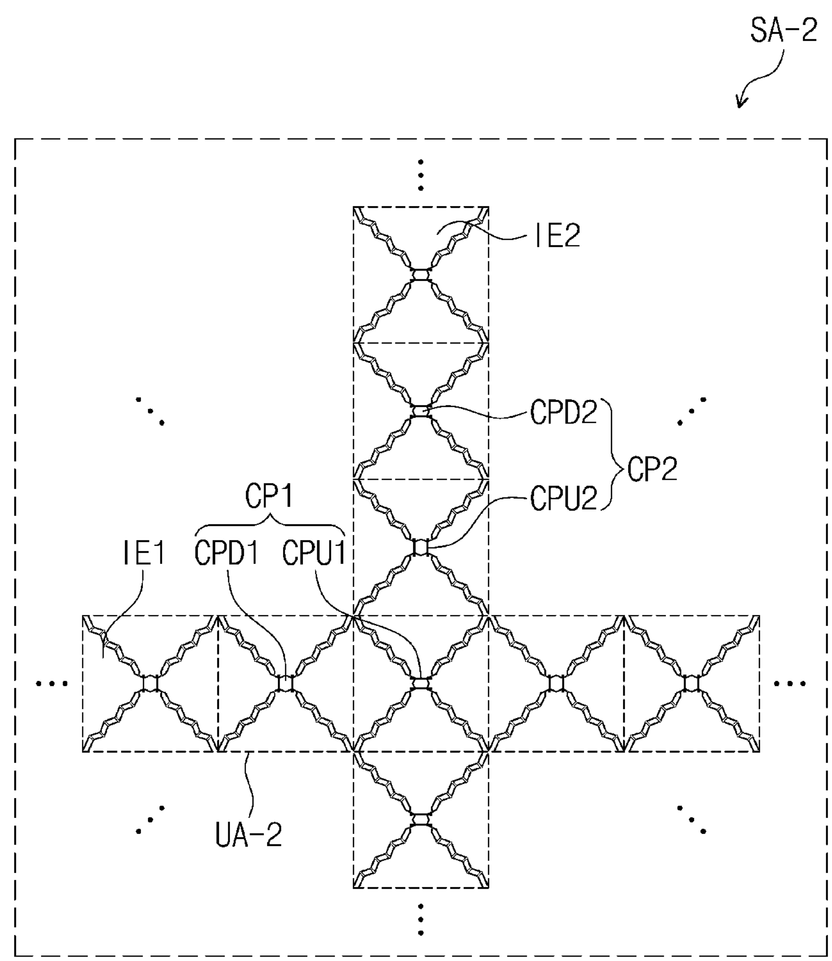
FIGS. 14 and 15 are plan views, each of which illustrates a modified structure of the input-sensing region of the input-sensing circuit of FIG. 7.
Figure 15:
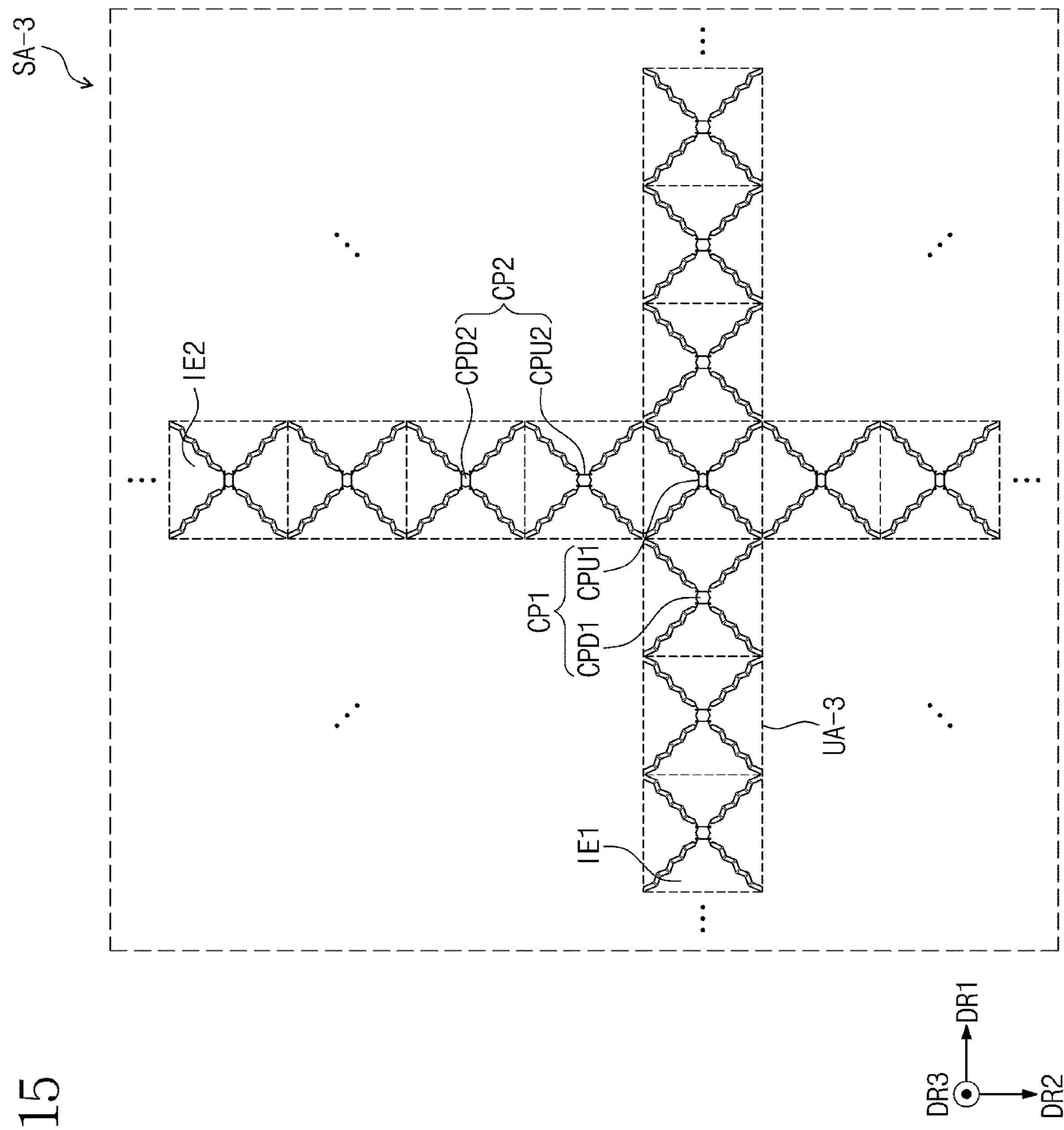

FIGS. 14 and 15 are plan views, each of which illustrates a modified structure of the input-sensing region SA of the input-sensing circuit ISC of FIG. 7. Some of unit regions UA-2 of an input-sensing region SA-2 are exemplarily illustrated in FIG. 14, and some of unit regions UA-3 of an input-sensing region SA-3 are exemplarily illustrated in FIG. 15.

In an exemplary embodiment, the first downside connecting portions CPD1 and the second downside connecting portions CPD2 may be disposed in the same layer as the sensors IE1 and IE2, and the first upside connecting portions CPU1 and the second upside connecting portions CPU2 may be disposed in a layer different from the sensors IE1 and IE2.

In an exemplary embodiment, the sensors IE1 and IE2, the first downside connecting portions CPD1, and the second downside connecting portions CPD2 may be portions of the first conductive pattern CPN1, and the first upside connecting portions CPU1 and the second upside connecting portions CPU2 may be portions of the second conductive pattern CPN2. However, the inventive concept is not limited to this example, and in certain embodiments, the sensors IE1 and IE2, the first downside connecting portions CPD1, and the second downside connecting portions CPD2 may be portions of the second conductive pattern CPN2, and the first upside connecting portions CPU1 and the second upside connecting portions CPU2 may be portions of the first conductive pattern CPN1.

In the present specification, the first downside connecting portion CPD1 may be referred to as a first sub-connecting portion, the first upside connecting portion CPU1 may be referred to as a second sub-connecting portion, the second downside connecting portion CPD2 may be referred to as a third sub-connecting portion, and the second upside connecting portion CPU2 may be referred to as a fourth sub-connecting portion.

Referring to FIG. 14, two adjacent ones of the first downside connecting portions CPD1 may electrically connect three adjacent ones of the first sensors IE1 to each other. One of the three adjacent ones of the first sensors IE1 may be electrically connected to the first upside connecting portion CPU1.

Two adjacent ones of the second downside connecting portions CPD2 may electrically connect three adjacent ones of the second sensors IE2 to each other. One of the three adjacent ones of the first sensors IE2 may be electrically connected to the second upside connecting portion CPU2.

Referring to FIG. 15, three adjacent ones of the first downside connecting portions CPD1 may electrically connect four adjacent ones of the first sensors IE1 to each other. One of the four adjacent ones of the first sensors IE1 may be electrically connected to the first upside connecting portion CPU1.

Three adjacent ones of the second downside connecting portions CPD2 may electrically connect four adjacent ones of the second sensors IE2 to each other. One of the four adjacent ones of the first sensors IE2 may be electrically connected to the second upside connecting portion CPU2.

According to an exemplary embodiment of the inventive concept, sensors disposed in one layer may have substantially the same area, which may reduce static electricity, occurring between the sensors. Thus, it may be possible to provide an input-sensing circuit, configured to suppress failures caused by static electricity, and a display module including the input-sensing circuit.

While example embodiments of the inventive concepts have been particularly shown and described, it will be understood by one of ordinary skill in the art that variations in form and detail may be made therein without departing from the spirit and scope of the attached claims.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An input-sensing circuit, comprising:

a plurality of first sensor groups extending in a first direction and arranged in a second direction crossing the first direction, each of which includes a plurality of first sensors;

a plurality of second sensor groups extending in the second direction and arranged in the first direction, and each of which includes a plurality of second sensors electrically separated from the plurality of first sensors;

a plurality of first connecting portions including a plurality of first upside connecting portions and a plurality of first downside connecting portions, each of which electrically connects two adjacent ones of the plurality of first sensors;

a plurality of second connecting portions including a plurality of second upside connecting portions and a plurality of second downside connecting portions, each of which electrically connects two adjacent ones of the plurality of second sensors; and an insulating member covering the plurality of first sensor groups, the plurality of second sensor groups, the plurality of first downside connecting portions, and the plurality of second downside connecting portions, a plurality of contact holes being defined in the insulating member, wherein the plurality of first upside connecting portions and the plurality of second upside connecting portions are electrically connected to the plurality of first sensors and the plurality of second sensors through the plurality of contact holes.

2. The input-sensing circuit of claim 1, wherein the plurality of first upside connecting portions and the plurality of first downside connecting portions are alternately arranged with respect to each other in the first direction and the second direction, and the plurality of second upside connecting portions and the plurality of second downside connecting portions are alternately arranged with respect to each other in the first direction and the second direction.

3. The input-sensing circuit of claim 1, wherein two ones of the plurality of first downside connecting portions electrically connect three adjacent ones of the plurality of first sensors, one of the plurality of first upside connecting portions is electrically connected to one of the three adjacent ones of the plurality of first sensors, two ones of the plurality of second downside connecting portions electrically connect three adjacent ones of the plurality of second sensors, and one of the plurality of second upside connecting portions is electrically connected to one of the three adjacent ones of the plurality of second sensors.

4. The input-sensing circuit of claim 1, wherein three ones of the plurality of first downside connecting portions electrically connect four adjacent ones of the plurality of first sensors, one of the plurality of first upside connecting portions is electrically connected to one of the four adjacent ones of the plurality of first sensors, three ones of the plurality of second downside connecting portions electrically connect four adjacent ones of the plurality of second sensors, and one of the plurality of second upside connecting portions is electrically connected to one of the four adjacent ones of the plurality of second sensors.

5. The input-sensing circuit of claim 1, wherein each of the plurality of first sensors and the plurality of second sensors comprises a first metal material, and each of the plurality of first connecting portions and the plurality of second connecting portions comprises a second metal material different from the first metal material.

6. The input-sensing circuit of claim 5, wherein the first metal material comprises indium tin oxide, indium zinc oxide, indium gallium zinc oxide, or zinc oxide, and the second metal material comprises molybdenum (Mo).

7. The input-sensing circuit of claim 5, further comprising:

a plurality of first signal lines, each of which is electrically connected to the plurality of first sensor groups and includes the second metal material;

a plurality of second signal lines, each of which is electrically connected to the plurality of second sensor groups and includes the second metal material; and a driving circuit, which is electrically connected to the first signal lines and the second signal lines to sense changes in capacitance between the plurality of first sensors and the second plurality of second sensors.

8. The input-sensing circuit of claim 1, wherein a plurality of openings are defined in each of the plurality of first sensors and the plurality of second sensors.

9. An input-sensing circuit, comprising:

a plurality of first sensor groups extending in a first direction and arranged in a second direction crossing the first direction, each of which includes a plurality of first sensors;

a plurality of second sensor groups extending in the second direction and arranged in the first direction, each of which includes a plurality of second sensors electrically separated from the plurality of first sensors, the plurality of second sensor groups being disposed in a same layer as the plurality of first sensor groups;

a plurality of first connecting portions including a plurality of first sub-connecting portions, which are disposed in a same layer as the plurality of first sensor groups, and a plurality of second sub-connecting portions, which are disposed in a layer different from the plurality of first sub-connecting portions, each of the plurality of first sub-connecting portions and the plurality of second sub-connecting portions electrically connecting two adjacent ones of the plurality of first sensors; and a plurality of second connecting portions including a plurality of third sub-connecting portions, which are disposed in a same layer as the plurality of first sub-connecting portions, and a plurality of fourth sub-connecting portions, which are disposed in a layer different from the plurality of third sub-connecting portions, each of the plurality of third sub-connecting portions and the plurality of fourth sub-connecting portions electrically connecting two adjacent ones of the plurality of second sensors.

10. The input-sensing circuit of claim 9, further comprising:

an insulating member covering the plurality of first sensor groups, the plurality of second sensor groups, the plurality of first sub-connecting portions, and the plurality of third sub-connecting portions, wherein the plurality of second sub-connecting portions and the plurality of fourth sub-connecting portions are disposed on the insulating member.

11. The input-sensing circuit of claim 9, further comprising an insulating member covering the plurality of second sub-connecting portions and the plurality of fourth sub-connecting portions, wherein the plurality of first sensor groups, the plurality of second sensor groups, the plurality of first sub-connecting portions, and the plurality of third sub-connecting portions are disposed on the insulating member.

12. The input-sensing circuit of claim 9, wherein the plurality of first sub-connecting portions and the plurality of second sub-connecting portions are alternately arranged with respect to each other, and the plurality of third sub-connecting portions and the plurality of fourth sub-connecting portions are alternately arranged with respect to each other.

13. The input-sensing circuit of claim 9, wherein each of the plurality of first sensors and the plurality of second sensors comprises a first metal material, and each of the plurality of first connecting portions and the plurality of second connecting portions comprises a second metal material different from the first metal material.

14. The input-sensing circuit of claim 9, wherein two ones of the plurality of first sub-connecting portions electrically connect three adjacent ones of the plurality of first sensors, one of the plurality of second sub-connecting portions is electrically connected to one of the three adjacent ones of the plurality of first sensors, two ones of the plurality of third sub-connecting portions electrically connect three adjacent ones of the plurality of second sensors, and one of the plurality of fourth sub-connecting portions is electrically connected to one of the three adjacent ones of the plurality of second sensors.

15. The input-sensing circuit of claim 9, wherein three ones of the plurality of first sub-connecting portions electrically connect four adjacent ones of the plurality of first sensors, one of the plurality of second sub-connecting portions is electrically connected to one of the four adjacent ones of the plurality of first sensors, three ones of the plurality of third sub-connecting portions electrically connect four adjacent ones of the plurality of second sensors, and one of the plurality of fourth sub-connecting portions is electrically connected to one of the four adjacent ones of the plurality of second sensors.

16. A display module, comprising:

a display panel including a plurality of light emission elements; and an input-sensing circuit disposed on the display panel, wherein the input-sensing circuit comprises:

a plurality of first sensor groups extending in a first direction and arranged in a second direction crossing the first direction, each of which includes a plurality of first sensors;

a plurality of second sensor groups extending in the second direction and arranged in the first direction, each of which includes a plurality of second sensors electrically separated from the plurality of first sensors;

a plurality of first connecting portions including a plurality of first upside connecting portions and a plurality of first downside connecting portions, each of which electrically connects two adjacent ones of the plurality of first sensors;

a plurality of second connecting portions including a plurality of second upside connecting portions and a plurality of second downside connecting portions, each of which electrically connects two adjacent ones of the plurality of second sensors; and an insulating member covering the plurality of first sensor groups, the plurality of second sensor groups, the plurality of first downside connecting portions, and the plurality of second downside connecting portions, a plurality of contact holes being defined in the insulating member, wherein the plurality of first upside connecting portions and the plurality of second upside connecting portions are electrically connected to the plurality of first sensors and the plurality of second sensors, through the plurality of contact holes.

17. The display module of claim 16, wherein a plurality of openings are defined in each of the plurality of first sensors and the plurality of second sensors, and the plurality of openings correspond to the plurality of light emission elements, respectively.

18. The display module of claim 16, wherein the input-sensing circuit is directly disposed on a surface of the display panel.

19. The display module of claim 16, wherein each of the plurality of first sensors and the plurality of second sensors comprises a first metal material, and each of the plurality of first connecting portions and the plurality of second connecting portions comprises a second metal material different from the first metal material.

20. The display module of claim 16, wherein the plurality of first upside connecting portions and the plurality of first downside connecting portions are alternately arranged with respect to each other in the first direction and the second direction, and the plurality of second upside connecting portions and the plurality of second downside connecting portions are alternately arranged with respect to each other in the first direction and the second direction.

* * * * *